US012722116B2

(12) United States Patent
Kim et al.

(10) Patent No.: US 12,722,116 B2
(45) Date of Patent: Sep. 1, 2026

(54) HUMIDITY CONTROL SYSTEM FOR EFEM USING DESICCANT

(71) Applicant: YEST Co., Ltd., Pyeongtaek-si (KR)

(72) Inventors: Tae Hoon Kim, Yongin-si (KR); Han Kil Yoo, Hwaseong-si (KR); Hyuk Jin Jang, Pyeongtaek-si (KR); Min Woo Choi, Pyeongtaek-si (KR); Da Woon Chae, Yongin-si (KR)

(73) Assignee: YEST Co., Ltd., Pyeongtaek-si (KR)

( * ) Notice: Subject to any disclaimer, the term of this patent is extended or adjusted under 35 U.S.C. 154(b) by 367 days.

(21) Appl. No.: 18/526,715

(22) Filed: Dec. 1, 2023

(65) Prior Publication Data

US 2025/0121318 A1 Apr. 17, 2025

(30) Foreign Application Priority Data

Oct. 13, 2023 (KR) ........................ 10-2023-0137207

(51) Int. Cl.
*B01D 53/22* (2006.01)
*B01D 53/06* (2006.01)
*B01D 53/26* (2006.01)

(52) U.S. Cl.
CPC ........... *B01D 53/261* (2013.01); *B01D 53/06* (2013.01); *B01D 2257/80* (2013.01); *B01D 2259/4009* (2013.01)

(58) Field of Classification Search
CPC .. B01D 53/261; B01D 53/06; B01D 2257/80; B01D 2259/4009
See application file for complete search history.

(56) References Cited

U.S. PATENT DOCUMENTS

2018/0124960 A1* 5/2018 Vincent ................ H05K 13/021

FOREIGN PATENT DOCUMENTS

| | | | |
|---|---|---|---|
| CN | 219696405 U * | 9/2023 | |
| KR | 10-2106625 B1 | 5/2020 | |
| KR | 102369463 B1 * | 3/2022 | .......... H10P 72/3408 |
| KR | 10-2022-0136278 A | 10/2022 | |

(Continued)

OTHER PUBLICATIONS

Machine Translation KR_102369463_B1_I (Year: 2022).*

(Continued)

*Primary Examiner* — Anthony Shumate
(74) *Attorney, Agent, or Firm* — Studebaker Brackett PLLC

(57) ABSTRACT

Disclosed is a humidity control system for an EFEM using desiccant includes the equipment front end module (EFEM) including a transfer chamber being a space, in which a processing target object is transferred into a processing module, and a desiccant equipment installed in the EFEM to be separable, and that controls a humidity of the transfer chamber, the desiccant equipment includes a plurality of block bodies coupled to or separated from each other, and being transportable individually, each of the plurality of block bodies accommodates a humidity control equipment, and the humidity control equipment includes: a desiccant rotor including an adsorbent that adsorbs moisture of air that is to be supplied to the transfer chamber, and being rotated by a driving motor, and a regenerative heater that heats the air and causes the heated air to remove the moisture adsorbed to the adsorbent.

6 Claims, 7 Drawing Sheets

(56) References Cited

FOREIGN PATENT DOCUMENTS

| | | | | |
|---|---|---|---|---|
| WO | WO-2018030255 A1 * | 2/2018 | ....... | H01L 21/67092 |
| WO | WO-2022104315 A1 * | 5/2022 | ......... | G05B 23/0283 |
| WO | WO-2025100836 A1 * | 5/2025 | ............. | B01D 53/75 |

OTHER PUBLICATIONS

CN_219696405_U_I Machine Translation (Year: 2023).*

Minsoo Lee et al.; "Electrokinetic-assisted filtration for fast and highly efficient removal of microplastics from water"; Chemical Engineering Journal 452 (2023) 139152; Elsevier; Sep. 11, 2022; pp. 1-11.

* cited by examiner

1
① ② ③ ④ ⑤
A

1
FT C D H FA
B

HUMIDITY CONTROL SYSTEM FOR EFEM USING DESICCANT

CROSS-REFERENCE TO RELATED APPLICATIONS

This application claims priority under 35 U.S.C. § 119 to Korean Patent Application No. 10-2023-0137207 filed on Oct. 13, 2023, in the Korean Intellectual Property Office, the disclosures of which are incorporated by reference herein in their entireties.

BACKGROUND

The present disclosure relates a humidity control system for an EFEM using desiccant, and more particularly, relate to a humidity control system for an EFEM using desiccant, which includes a plurality of bodies and may easily control a humidity of a transfer chamber through a desiccant equipment that may be installed in and separated from an EFEM.

In general, a cluster equipment of a semiconductor process uses various chemical gases while a process is performed, and then, gases reside on a wafer after the process is ended in an interior of a chamber.

Therefore, when unloading and remaining gases, fumes, or the like, in a front opening unified pod (FOUP) (a storage container for semiconductor processing) reacts with moisture, particles may be formed on a wafer or defects may occur.

In an environmental condition in an interior of an existing equipment front end module (EFEM), humidity is not controlled and air in an interior of an FAB is supplied through a fan filter unit (FFU), and thus, the humidity that exists in the air and the residual gases on the wafer react easily whereby particles or defects may be easily created. Furthermore, because the wafer stands by in the FOUP for a long time as a process usually takes one hour or so in a specific process, yield rate is lowered, for example, as the residual gases on the wafer and the air in the interior of the EFEM, which is not dehumidified, react each other and generate particles.

Meanwhile, when a wafer stands by in the interior of the FOUP after a process, a system that supplies nitrogen $N_2$ into the interior to minimize humidity may be used. However, when the system that supplies nitrogen $N_2$ is constructed, a large amount of nitrogen has to be introduced into a completely closed space, and thus, high costs are necessary (see Korean Patent No. 10-2106625)

Moreover, in the conventional technology, because the desiccant equipment is installed integrally with the EFEM, it is difficult to individually manage the desiccant equipment.

SUMMARY

To solve the problem, a humidity control system for an EFEM using desiccant that lowers an interior humidity of a space of the transfer chamber, such as an EFEM coupled to a semiconductor manufacturing apparatus, while not using nitrogen, through a desiccant equipment that may be individually managed, and improves an environmental condition, in which particles may be generated on a wafer after a process is ended is necessary.

An aspect of the present disclosure provides a humidity control system for an EFEM using desiccant that includes a plurality of block bodies and may easily control a humidity of a transfer chamber through a desiccant equipment that may be installed in and separated from an EFEM.

The technical problems to be solved by the present disclosure are not limited to the aforementioned problems, and any other technical problems not mentioned herein will be clearly understood from the following description by those skilled in the art to which the present disclosure pertains.

According to an embodiment, a humidity control system for an EFEM using desiccant includes the equipment front end module (EFEM) including a transfer chamber being a space, in which a processing target object is transferred into a processing module, and a desiccant equipment installed in the EFEM to be separable, and that controls a humidity of the transfer chamber, the desiccant equipment includes a plurality of block bodies coupled to or separated from each other, and being transportable individually, each of the plurality of block bodies accommodates a humidity control equipment, and the humidity control equipment includes: a desiccant rotor including an adsorbent that adsorbs moisture of air that is to be supplied to the transfer chamber, and being rotated by a driving motor, and a regenerative heater that heats the air and causes the heated air to remove the moisture adsorbed to the adsorbent.

BRIEF DESCRIPTION OF THE FIGURES

The above and other objects and features of the present disclosure will become apparent by describing in detail embodiments thereof with reference to the accompanying drawings.

DETAILED DESCRIPTION

The present disclosure is not limited to the embodiments disclosed hereinafter but may be implemented in various different forms, and the embodiments are provided to fully disclose the present disclosure and perfectly inform an ordinary person in the art, to which the present disclosure pertains, of the scope of the present disclosure.

In the specification, a singular form includes a plural form unless particularly mentioned in the context. The expression "comprises" and/or "comprising" used in the specification does not exclude presence or addition of one or more other components, steps, and operations, in addition to the mentioned component, step, and operation.

Referring to FIGS. 1 to 5, a desiccant equipment that includes a plurality of block bodies and may be installed in and separated from an EFEM, in a humidity control system for an EFEM using desiccant according to the present disclosure will be described.

Figure 1:
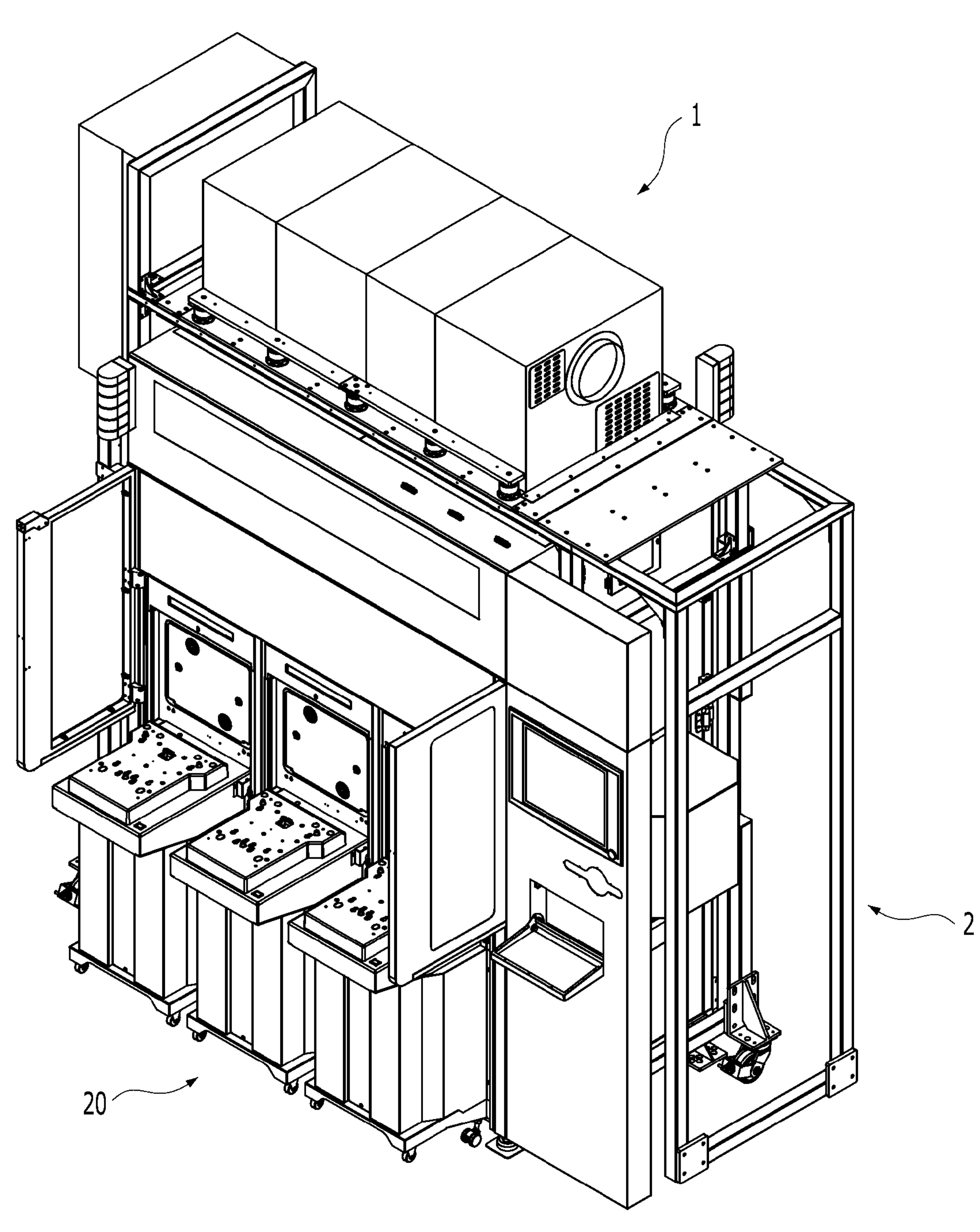
FIG. 1 is a view illustrating a desiccant equipment that may be installed in and separated from an EFEM in a humidity control system for an EFEM using desiccant according to the present disclosure.
Figure 2:
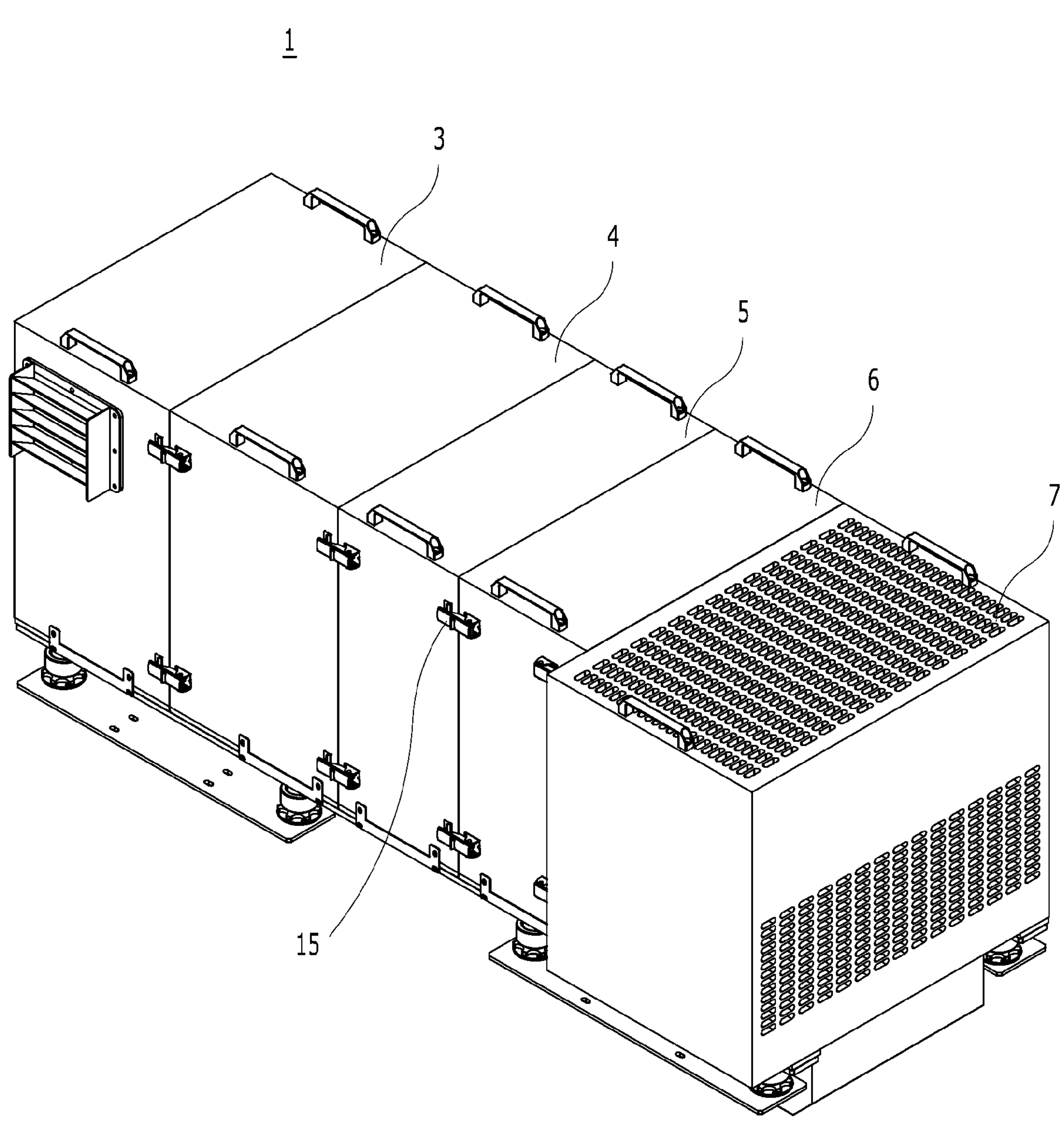
FIG. 2 is a view illustrating a desiccant equipment including a plurality of block bodies.

FIG. 1 is a view illustrating the desiccant equipment that may be installed in and separated from the EFEM in the humidity control system for an EFEM using desiccant according to the present disclosure. FIG. 2 is a view illustrating a desiccant equipment including a plurality of block bodies.

Figure 3:
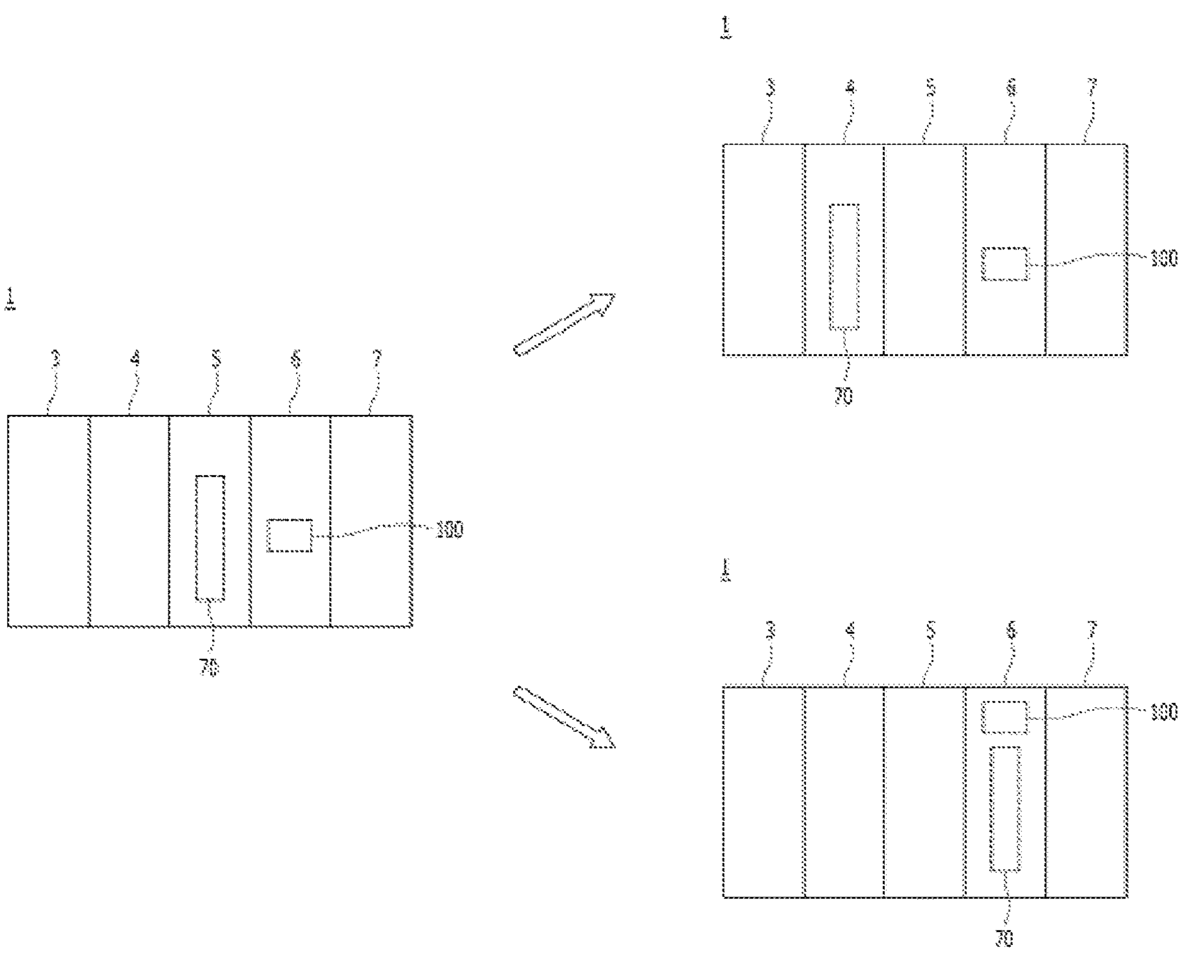
FIG. 3 is a view illustrating an aspect that a kind or the number of humidity control equipments allocated to and accommodated in a plurality of block bodies may be adjusted.
Figures 4, 5A, 5B:
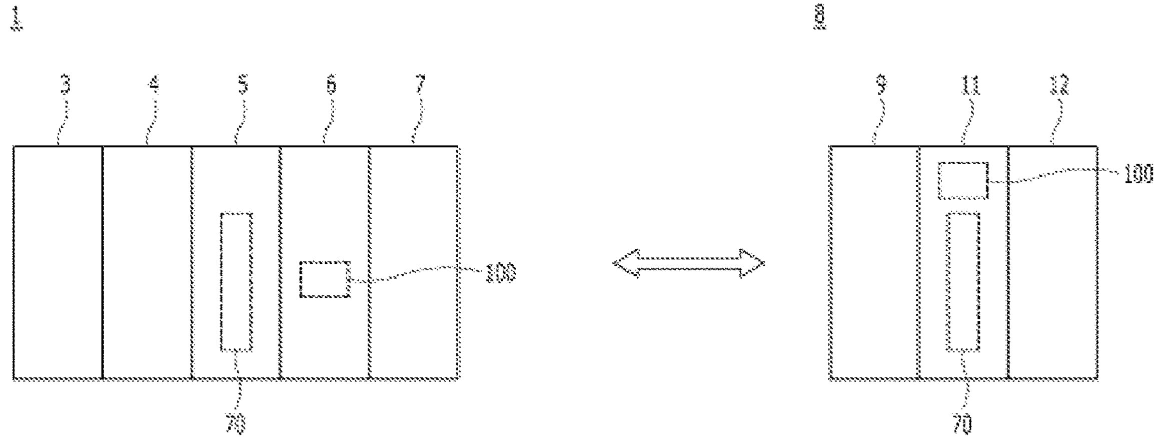
FIG. 4 is a view illustrating an aspect that the number of the plurality of block bodies may be adjusted, and thus, a kind and the number of humidity control equipments accommodated in a specific block body may be adjusted.
FIGS. 5A and 5B are views illustrating a state, in which a plurality of block bodies have a specific mark.

FIG. 3 is a view illustrating an aspect that a kind or the number of humidity control equipments allocated to and accommodated in a plurality of block bodies may be adjusted. FIG. 4 is a view illustrating an aspect that the number of the plurality of block bodies may be adjusted, and thus, a kind and the number of humidity control equipments accommodated in a specific block body may be adjusted. FIGS. 5A and 5B are views illustrating a state, in which the plurality of block bodies have a specific mark.

Referring to FIGS. 1 to 5, a humidity control system 10 for an EFEM using desiccant according to the present disclosure may include an equipment front end module (EFEM) 20 including a transfer chamber, in which a processing target object is transferred to a processing module, and desiccant equipments 1 and 8 that control a humidity a transfer chamber "T".

The EFEM 20 is a standard interface module of a processing equipment, which supplies a processing target object, such as a wafer or a mask in a cassette in a semiconductor line to a processing module.

Figure 6:
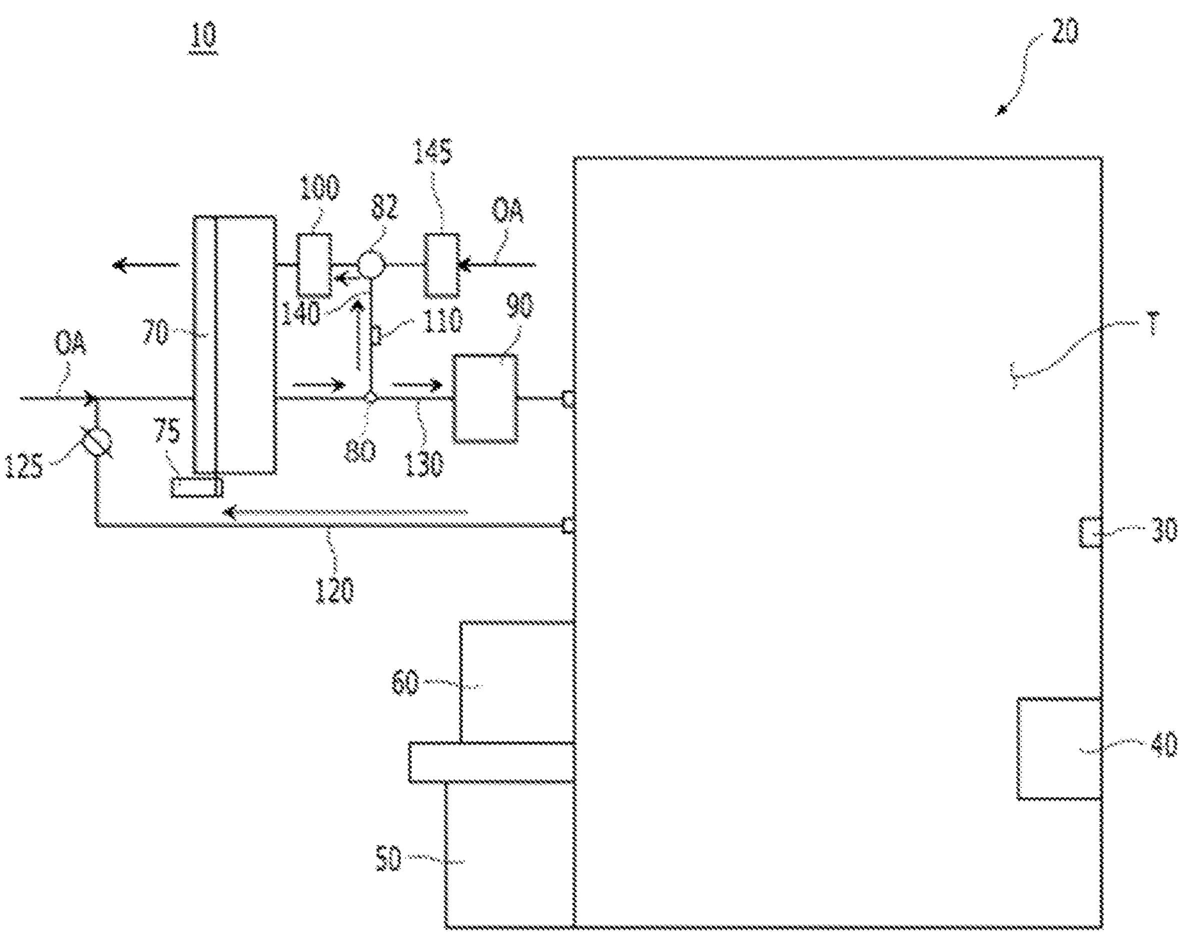
FIG. 6 is a conceptual view of a humidity control system for an EFEM using desiccant according to an embodiment of the present disclosure.

The EFEM 20 may include the transfer chamber "T" that is a space, in which the processing target object, such as a wafer or a mask, is transferred to the processing module, an ATM robot that includes robot nippers and transfers the processing target object, such as a wafer or a mask in a cassette, to the processing module, an aligner that aligns the processing target object in a specific direction when the processing target object, such as a wafer, is transferred to the processing module, a fan filter unit (FFU) that cleans air in the transfer chamber "T" to prevent contamination of the processing target object, a front-opening unified pod 60 that accommodates the processing target object that is to be transferred to the processing module, and a load port 50 that is disposed on a lower side of the FOUP 60 to support the FOUP 60 (see FIG. 6).

The desiccant equipment 1 and 8 is a system that may be installed in and separated from the EFEM 20 and control a humidity of the transfer chamber "T" that constitutes the EFEM 20.

As illustrated in FIG. 1, in the present disclosure, the desiccant equipment 1 is not integral with the EFEM 20, and the desiccant equipment 1 may be installed in the EFEM 20 or separated from the EFEM 20 in a state, in which it is supported by an installation frame 2.

Accordingly, the EFEM may be easily installed as compared with an integral type, and the desiccant equipment also may be installed in an existing EFEM having no desiccant equipment whereby the humidity of the air in the transfer chamber also may be controlled in the existing EFEM.

Furthermore, as illustrated in FIG. 2, the desiccant equipment 1 may include a plurality of block bodies 3, 4, 5, 6, and 7 that are coupled to or separated from each other to be individually transported.

That is, the desiccant equipment 1 is not of an integral type but of a division type, and thus, the desiccant equipment 1 may be individually transported.

In this way, because the desiccant equipment 1 may be transported while being separated, a size and a weight thereof becomes smaller than those of the integral desiccant equipment whereby spatial restrictions related to transportation may be reduced and the desiccant equipment 1 may be easily transported and installed.

Furthermore, each of the plurality of block bodies 3, 4, 5, 6, and 7 may accommodate the humidity control equipment allocated thereto.

The humidity control equipment may include an adsorbent that adsorbs moisture in the air that is to be supplied to the transfer chamber "T", and may include a desiccant rotor 70 that is rotated by a driving motor 75, and a regenerative heater 100 that heats the air and causes the heated air to remove the moisture adsorbed by the adsorbent.

That is, the humidity control equipment that controls the humidity of the transfer chamber "T" may be divided and be individually accommodated in the plurality of block bodies 3, 4, 5, 6, and 7 to be operated.

For example, the desiccant rotor 70 may be accommodated in any one of the plurality of block bodies 3, 4, 5, 6, and 7, the regenerative heater 100 may be accommodated in another block body, and a fan may be accommodated in another block body.

Because the humidity control equipments are individually accommodated, only the block body that accommodates the humidity control equipment that has to be replaced or repaired may be separated from the desiccant equipments 1 and 8 to be easily replaced or repaired.

Meanwhile, as illustrated in FIG. 2, in relation to coupling of the plurality of block bodies 3, 4, 5, 6, and 7, the adjacent block bodies may be fixed through a surface pressure, and additionally, may be fixed by a coupling member, such as a cicada ring 15. Of course, the coupling scheme of the block bodies is not limited thereto, and may be various.

For example, socket type coupling or bolting may be applied for coupling of the block bodies.

Next, the kind or the number of the humidity control equipments allocated to and accommodated in each of the plurality of block bodies 3, 4, 5, 6, and 7 may be adjusted.

That is, a specific humidity control equipment may be accommodated in, among the plurality of block bodies 3, 4, 5, 6, and 7, a specific block body, and according to occasions, may be accommodated not in the specific block body but in the another block body. Furthermore, only one humidity control equipment or several humidity control equipments may be accommodated in the specific block body.

Referring to FIG. 3, a total of five block bodies 3, 4, 5, 6, and 7 may be present, and the desiccant rotor 70 may be accommodated in the third block body 5, and the regenerative heater 100 may be accommodated in the fourth block body 6.

Thereafter, the desiccant rotor 70 may be accommodated in the second block body 4 in consideration of a change in an installation environment or a change in a humidity control scheme.

Furthermore, the desiccant rotor 70 and the regenerative heater 100 may be accommodated and installed in the fourth block body 6 together.

Accordingly, an optimum transfer chamber humidity control environment may be created in consideration of various conditions, and an installation compatibility of the desiccant equipment 1 may be increased.

Next, the number of the plurality of block bodies may be adjusted, and accordingly, the kind or the number of the humidity control equipments accommodated in the specific block body may be adjusted.

That is, the number of the block bodies may be adjusted in consideration of various conditions, such as an installation environment, and accordingly, the kind and the number of the humidity control equipments installed in the block body also may be adjusted.

Referring to FIG. 4, the plurality of block bodies 3, 4, 5, 6, and 7 may be five block bodies, and may be three block bodies 9, 11, and 12.

Moreover, in the five block bodies 3, 4, 5, 6, and 7, the desiccant rotor 70 may be accommodated in the third block body 5, and the regenerative heater 100 may be accommodated in the fourth block body 6.

Meanwhile, in the three block bodies 9, 11, and 12, the desiccant rotor 70 and the regenerative heater 100 may be accommodated in the second block body 11 together.

Accordingly, an optimum transfer chamber humidity control environment may be created in consideration of various conditions, and an installation compatibility of the desiccant equipments 1 and 8 may be increased.

Additionally, as illustrated in FIGS. 5A and 5B, each of the plurality of block bodies 3, 4, 5, 6, and 7 may have a specific mark, and the specific mark may include at least one of a number mark "A", and a mark "B" that represents the kind of the accommodated humidity control equipment.

Because the specific mark is present on a surface of each of the block bodies 3, 4, 5, 6, and 7 in this way, a coupling sequence of the block bodies 3, 4, 5, 6, and 7 may be intuitively recognized, and thus the block bodies 3, 4, 5, 6, and 7 may be easily coupled.

Furthermore, because it may be intuitively recognized which humidity control equipments are accommodated in the block bodies 3, 4, 5, 6, and 7, the humidity control equipments may be easily replaced and monitored.

Meanwhile, the humidity control equipment may further include a particle removing filter and an organic material removing filter.

The particle removing filter is a filter that removes particles that are generated in a process of adsorbing moisture by the adsorbent and a process of removing the moisture adsorbed by the adsorbent.

The organic material removing filter is a filter that removes an organic material that flows in an interior of the desiccant equipment.

Various organic materials may be generated during a semiconductor process, and the organic materials may flow in an interior of the semiconductor equipment, and also may be introduced into the desiccant equipment.

Because the organic materials may lower a yield rate of the semiconductor process and may degrade a quality of a process environment, the organic materials may be removed by installing the organic material removing filter.

The filter may be accommodated and installed in, among the plurality of block bodies, a specific block body, and accordingly, when a filter is to be replaced, only a specific block body that accommodates the filter that is to be replaced may be separated and a filter replacing operation may be performed.

Accordingly, a replacement operation of the particle removing filter and the organic material removing filter may be easily performed.

Until now, the desiccant equipment that may be installed in and separated from the EFEM and include the plurality of block bodies in the humidity control system for an EFEM using desiccant according to the present disclosure has been discussed.

Hereinafter, a scheme of controlling a humidity of the transfer chamber of the EFEM through the desiccant equipment will be discussed in detail.

Figure 7:
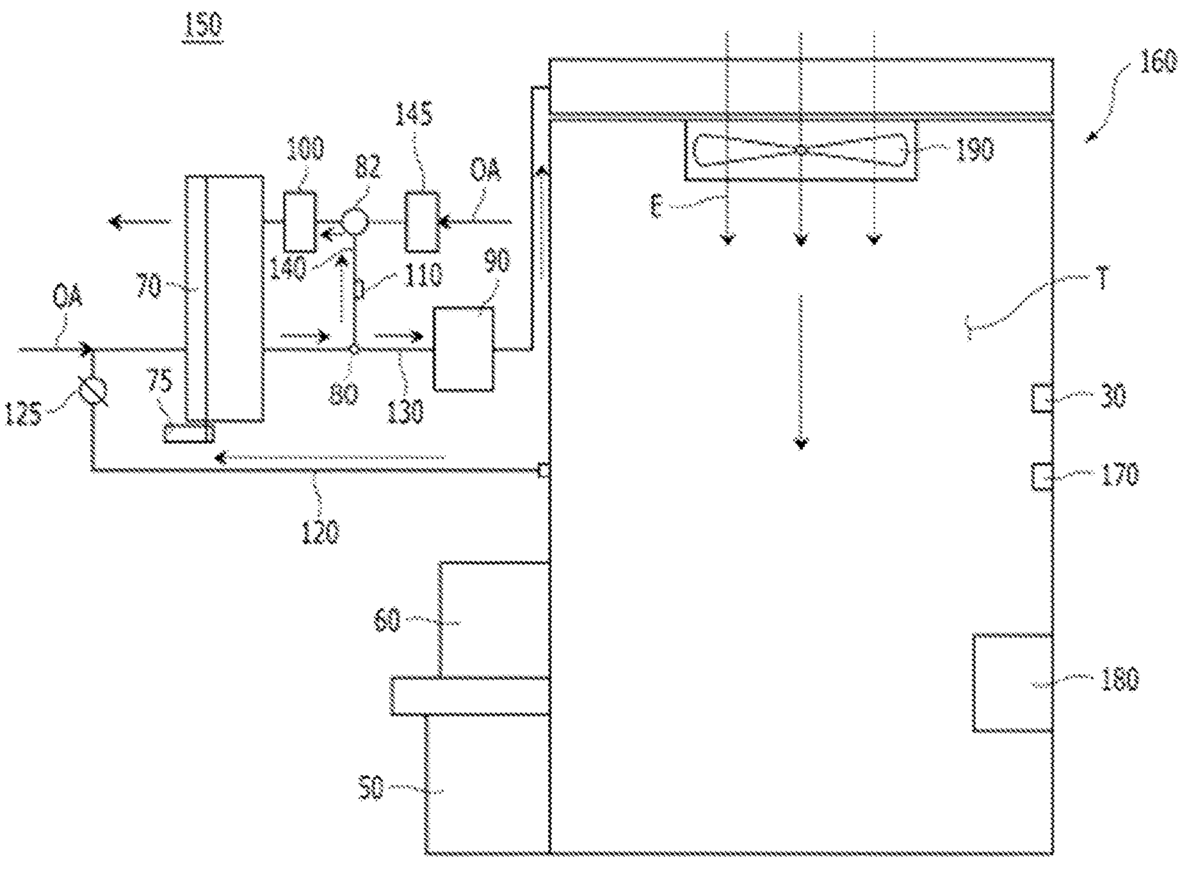
FIG. 7 is a conceptual view of a humidity control system for an EFEM using desiccant according to another embodiment of the present disclosure.
Figure 8:
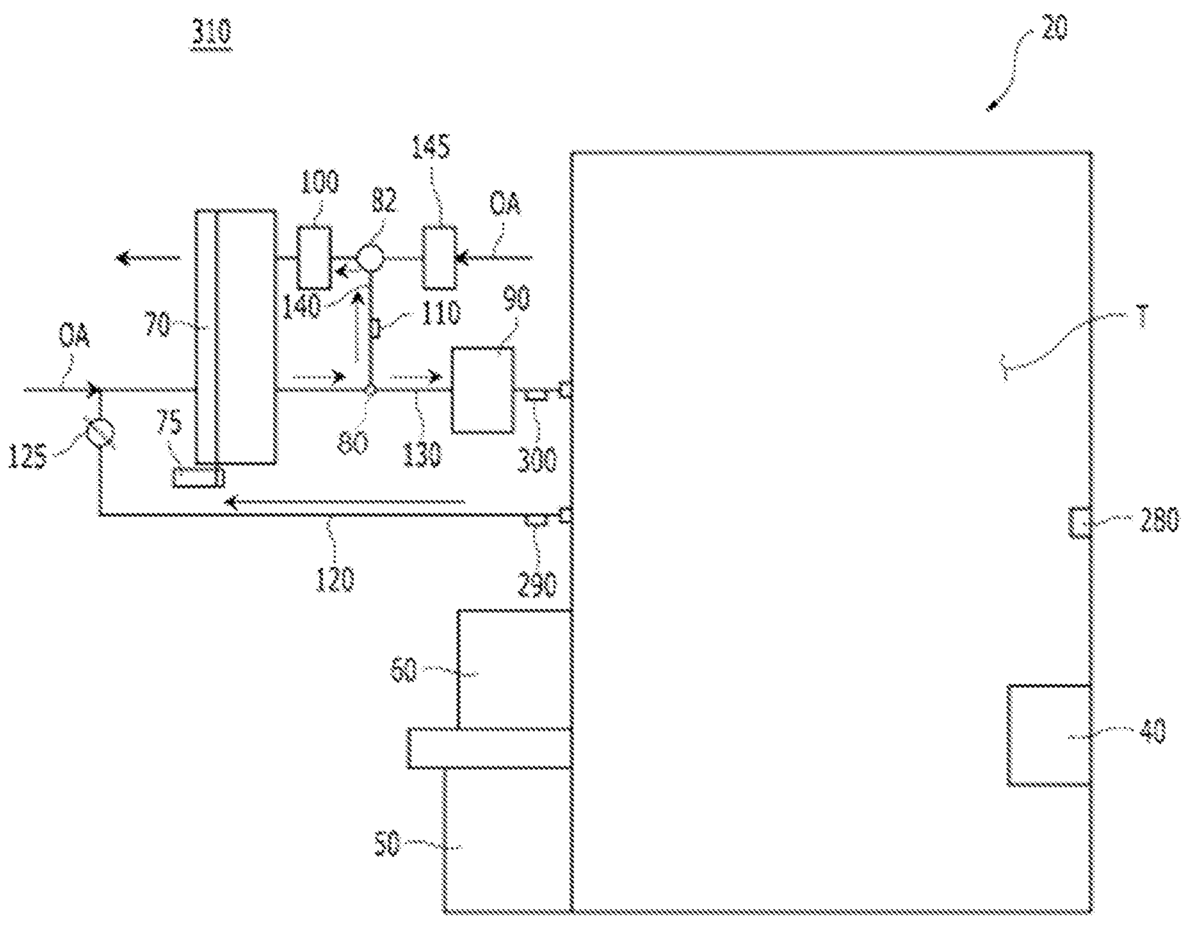
FIG. 8 is a conceptual view of a humidity control system for an EFEM using desiccant according to another embodiment of the present disclosure.

Meanwhile, for helping understanding of the invention, the plurality of block bodies are not expressed in FIGS. 6 to 8, and only the humidity control equipment that is accommodated in the plurality of block bodies is expressed. Furthermore, although the humidity control equipment is located on a side of the EFEM on the drawings, the humidity control equipment may be installed at various locations, such as an upper side of the EFEM.

Referring to FIG. 6, the humidity control system for an EFEM using desiccant according to an embodiment of the present disclosure will be described. FIG. 6 is a view illustrating the humidity control system for an EFEM using desiccant according to an embodiment of the present disclosure.

Referring to FIG. 6, the humidity control system for an EFEM using desiccant according to an embodiment of the present disclosure may include the EFEM 20 including the transfer chamber that is a space, in which a wafer is transferred to a process module, and the above-described desiccant equipment.

The desiccant equipment is a system that controls a humidity of the transfer chamber "T" that constitutes the EFEM 20.

In this regard, various chemical gases are used while a semiconductor process is performed, and then, gases reside on the wafer after a process is ended in the transfer chamber. Accordingly, particles or defects may be caused on the wafer during unloading or when gases, fumes, or the like that reside in the FOUP 60 react with moisture.

That is, the residual gases on the wafer and the air in the interior of the EFEM, which is not dehumidified, may react each other whereby yield rate may be lowered, for example, when particles are generated.

To solve the problem, it is necessary to control the humidity in the transfer chamber, and in the present disclosure, the desiccant may be used to control the humidity.

The desiccant equipment may include a transfer chamber air recovery line 120, the desiccant rotor 70, a branch unit 80, a temperature control device 90, a dehumidified air supply line 130, a regenerative air supply line 140, a temperature sensor 110, a regenerative fan 145, and the regenerative heater 100.

One side of the transfer chamber air recovery line 120 may be fluid-communicated with the transfer chamber "T", and an opposite side thereof may be connected to the desiccant rotor 70.

In this connection relationship, the wet air in the transfer chamber "T" may be supplied to the desiccant rotor 70 after flowing along the transfer chamber air recovery line 120.

Then, a blower may be installed between the transfer chamber "T" and the transfer chamber air recovery line 120 such that the wet air in the transfer chamber "T" flows to the transfer chamber air recovery line 120.

The adsorbent that adsorbs the moisture in the housing may be accommodated in the desiccant rotor 70.

Outdoor air OA, or mixture air of the outdoor air OA and indoor air (the air provided from the transfer chamber "T") may flow to an adsorption section (a dehumidification section) of the desiccant rotor 70 to be dehumidified.

Meanwhile, a wet air damper 125 may be installed on the transfer chamber air recovery line 120, and the wet air damper 125 may control an amount of the indoor air that flows to the desiccant rotor 70 in consideration of the humidity in the transfer chamber "T".

That is, the desiccant rotor 70 may include the adsorbent that adsorbs the moisture in the outdoor air and the mixture air, and may remove the moisture from the outdoor air or the mixture air through the adsorbent.

In detail, the wet air supplied to the desiccant rotor 70 may contact the adsorbent in the housing, and the moisture contained in the wet air may be adsorbed by the adsorbent whereby the wet air may become dehumidified air or dry air.

During the adsorption phenomenon, a force that is stronger than an attractive force between molecules is applied to a surface of the adsorbent when the adsorbent is condensed so that heat that is higher than condensation heat is generated, and this heat is called adsorption heat, which is around 1.5 to 2.0 times of the condensation heat.

Accordingly, the dehumidified air that is dehumidified and exits from the desiccant rotor 70 may be heated by the adsorption heat and may have a high temperature of 50° C. or more.

Meanwhile, silica gel or zeolite may be used as the adsorbent, but the present disclosure is not limited thereto.

Furthermore, the desiccant rotor 70 may be rotated by the driving motor 75, and through this rotation, the adsorption section of the adsorbent, which absorbed the moisture in the air, may be moved to a regeneration zone for removing the moisture, and the adsorption section in turn may be moved to the adsorption zone through rotation thereof.

The branch unit 80 is a unit for branching the dehumidified air that exits from the desiccant rotor 70.

The dehumidified air exiting from the desiccant rotor 70 may flow to the desiccant rotor 70 again such that a portion thereof is utilized as regenerative air while passing through the branch unit 80, and the remaining portion thereof may flow to the transfer chamber "T".

Meanwhile, a branch pipe or a 3-way valve may be used as the branch unit 80.

The temperature control device 90 is a device that controls a temperature of the remaining portion of the dehumidified air branched in the branch unit 80 to a set temperature.

As described above, the remaining portion of the dehumidified air branched in the branch unit 80 may flow toward the transfer chamber "T", but the remaining portion of the dehumidified air may have a high temperature that is not suitable for the transfer chamber "T" due to the adsorption heat.

In consideration of this point, the temperature control device 90 may be installed on the dehumidified air supply line 130, and the temperature control device 90 may lower a temperature of the dehumidified air that flows toward the transfer chamber "T" such that the temperature becomes a set temperature.

Meanwhile, the temperature control device 90 is an air cooler, a cooling coil, a heat exchanger, an evaporator, or the like, but the present disclosure is not limited thereto.

The dehumidified air supply line 130 is a line, in which the remaining portion of the dehumidified air branched through the branch unit 80 flows, and the remaining portion of the dehumidified air, a temperature of which is controlled to the set temperature by the temperature control device 90, may be supplied to the transfer chamber "T".

The regenerative air supply line 140 is a line that supplies the remaining portion of the dehumidified air branched in the branch unit 80 or the outdoor air OA to the desiccant rotor 70.

In a scheme of supplying the air that is to be used in a process of regenerating the desiccant rotor 70 to the desiccant rotor 70, first, as in FIG. 6, the outdoor air OA may be pushed in through the regenerative fan 145 located on a rear side of the desiccant rotor 70.

Alternatively, the regenerative fan may suction the outdoor air OA such that the outdoor air OA flows in while being located on a front side of the desiccant rotor 70.

The outdoor air OA introduced in this way may be heated by the regenerative heater 100 and may be supplied to the regeneration section of the desiccant rotor 70.

Furthermore, as the regenerative air, a portion of the dehumidified air or mixture air of a portion of the dehumidified air and the outdoor air OA, as well as the above-described outdoor air, may be used.

To achieve this, a portion of the dehumidified air that flows through the regenerative air supply line 140 may flow to a mixing unit 82 and may be mixed with the outdoor air OA introduced by the regenerative fan 145 to generate the mixture air, and the mixture air may be supplied to the regeneration section of the desiccant rotor 70 after being heated by the regenerative heater 100.

Meanwhile, the mixing unit 82 may be a damper, a 3-way valve, or the like, and the kind thereof is not limited.

The mixing unit 82 may adjust amounts of the portion of the dehumidified air and the outdoor air OA that constitute the mixture air depending on a situation, through opening and closing of a path.

That is, according to occasions, only the portion of the dehumidified air or only the outdoor air OA may be used as the regenerative air due to the mixing unit 82.

The supplied portion of the dehumidified air may remove the moisture from the adsorbent that adsorbs the moisture such that the adsorbent may be used again.

Generally, outdoor air is introduced, heated, and supplied to the desiccant rotor 70 to remove the moisture from the adsorbent used for adsorption of air, but in the present disclosure, according to occasions, the dehumidified air heated with the adsorption heat may be utilized while the outdoor air not having to be introduced, or a relatively small amount of outdoor air may be used.

Accordingly, a structure of the desiccant equipment may be simplified and made small-sized, and the humidity of the transfer chamber "T" may be controlled simply and easily.

Moreover, because the portion of the dehumidified air is dehumidified to be dry, a moisture adsorption performance is excellent, and because the portion has a relatively high temperature due to the adsorption heat, energy that is necessary for heating the regenerative heater 100 may be reduced.

The temperature sensor 110 is a sensor that is installed on the regenerative air supply line 140 to measure a temperature of the portion of the dehumidified air.

Even when the temperature of the portion of the dehumidified air is high, the temperature may not be high enough such that the moisture may be removed from the adsorbent and the adsorbent may be utilized again.

In consideration of this, the temperature sensor 110 may measure a temperature of a portion of the dehumidified air, and accordingly, it may be recognized whether the portion of the dehumidified air has a temperature, by which the moisture may be removed from the adsorbent.

The regenerative heater 100 is a device that is installed on the regenerative air supply line 140 to heat the regenerative air.

As described above, the portion of the dehumidified air, the outdoor air, and the mixture air thereof may be used as the regenerative air In particular, the regenerative heater 100 may heat the portion of the dehumidified air when the temperature measured by the temperature sensor 110 is less than a temperature set value.

When the measured temperature is less than the temperature set value that is a temperature, by which it is difficult to remove the moisture from the adsorbent, in the result of measuring the temperature of the portion of the dehumidified air by the temperature sensor 110, the regenerative heater 100 may heat the portion of the dehumidified air such that the temperature of the portion is a temperature set value or more.

Additionally, the humidity control system for an EFEM using desiccant according to an embodiment of the present disclosure may further include a temperature/humidity sensor 30 and a control device 40.

The temperature/humidity sensor 30 is a sensor that is installed in the transfer chamber "T" of the EFEM 20 to measure a temperature and a humidity of the transfer chamber "T".

The control device 40 is a device that controls a process of a humidity of the EFEM 20 while being installed in the EFEM 20 or being present separately from the EFEM 20.

As one form, the control device 40 may operate the desiccant equipment when the humidity measured by the temperature/humidity sensor 30 is more than a reference value, and then, may stop an operation of the desiccant equipment when the humidity reaches a humidity reference value.

Here, the humidity reference value may mean a humidity, by which a problem of decreasing yield rate occurs, for example, by generating particles as the residual gas on the processing target object, such as a wafer, and the air in the interior of the EFEM 20, which is not dehumidified, react each other.

The desiccant equipment is operated only when it is necessary to control the humidity of the transfer chamber "T" through the control device 40, and thus the desiccant equipment may not be operated unnecessarily whereby the equipment may be efficiently operated, for example, by saving energy.

Additionally, the control device 40 may control a degree, by which the regenerative heater 100 heats a portion of the dehumidified air, depending on the humidity of the transfer chamber "T", which is measured by the temperature/humidity sensor 30, and may control a degree, by which the driving motor 75 rotates the desiccant rotor 70, at the same time.

In this regard, a degree of the moisture contained in the air that exits from the transfer chamber "T" may be changed, and thus, a regeneration speed, at which the moisture is removed from the adsorbent, and a time period, for which the regenerated adsorbent returns to the adsorption section, need to be adjusted.

That is, as the humidity of the transfer chamber "T" increases, the temperature of the portion of the dehumidified air used as the regenerative air needs to become higher, and the regenerated adsorbent needs to return to the adsorption section early and to be introduced to the adsorption process again.

In consideration of this point, the control device 40 may control the regenerative heater 100 and the driving motor 75 depending on the transfer chamber "T".

Until now, the humidity control system for an EFEM using desiccant according to an embodiment of the present disclosure has been described. Hereinafter, referring to FIG. 7, a humidity control system for an EFEM using desiccant according to another embodiment of the present disclosure will be described. FIG. 7 is a view illustrating the humidity control system for an EFEM using desiccant according to the another embodiment of the present disclosure.

Referring to FIG. 7, the humidity control system for an EFEM using desiccant according to the another embodiment of the present disclosure may further include an outdoor air fan 190 and a pneumatic pressure sensor 170, in addition to the above-described components of the humidity control system for an EFEM using desiccant.

The outdoor air fan 190 is a fan for introducing outdoor air E into the transfer chamber "T", and accordingly, may prevent external impurities from being introduced into the transfer chamber "T" by forming a positive pressure in an interior of the transfer chamber "T" of an EFEM 160.

The pneumatic pressure sensor 170 is a sensor that measures a pneumatic pressure of the transfer chamber "T", and accordingly, may check whether the transfer chamber "T" is maintained at the positive pressure.

Meanwhile, according to the present disclosure, because only the remaining portion of the dehumidified air is introduced into the transfer chamber "T" during an operation of the desiccant equipment, an amount of the air in the transfer chamber may be reduced, and thus, a positive pressure may not be formed in the interior of the transfer chamber.

In consideration of this point, a control device 180 may operate the outdoor air fan 190 such that the pneumatic pressure reaches a pneumatic pressure reference value when the pneumatic pressure measured by the pneumatic pressure sensor 170 is less than the pneumatic pressure reference value due to the operation of the desiccant equipment.

Until now, the humidity control system for an EFEM using desiccant according to the another embodiment of the present disclosure has been described. Hereinafter, referring to FIG. 8, a humidity control system for an EFEM using desiccant according to another embodiment of the present disclosure will be described. FIG. 8 is a conceptual view illustrating the humidity control system for an EFEM using desiccant according to the another embodiment of the present disclosure.

Referring to FIG. 8, the humidity control system for an EFEM using desiccant according to the another embodiment of the present disclosure may have a plurality of humidity sensors, and may measure the humidity of the air at several points.

In detail, the humidity sensor may include a humid air humidity sensor 290 that is installed on the transfer chamber air recovery line 120, a dry air humidity sensor 300 that is installed on the dehumidified air supply line 130, and a transfer chamber humidity sensor 280 that is installed in the transfer chamber "T".

Then, the control device 40 may select any one of the humid air humidity sensor 290, the dry air humidity sensor 300, and the transfer chamber humidity sensor 280, and may increase a degree, by which the regenerative heater 100 heats a portion of the dehumidified air, and a degree, by which the driving motor 75 rotates the desiccant rotor 70, when the humidity measured by the selected humidity sensor is more than a reference humidity value.

Generally, when a first humidity in the transfer chamber "T", a second humidity on the transfer chamber air recovery line 120, and a third humidity on the dehumidified air supply line 130 are compared, the second humidity is the highest, the first humidity is the second highest, and the third humidity is the lowest.

Accordingly, a case, in which the second humidity is more than the reference humidity value, may be most frequent, and a case, in which the third humidity is more than the reference humidity value, may be least frequent.

That is, depending on which humidity sensor the control device 40 selects, it may be determined how frequently the operation degrees of the regenerative heater 100 and the driving motor 75 are changed.

In consideration of this point, depending on whether the regenerative heater 100 and the driving motor 75 desires to react with a change in the humidity sensitively or insensitively in contrast, the control device 40 may select any one of the above-described plurality of humidity sensors and measure the humidity of the air.

According to the present disclosure, the humidity control system for an EFEM using desiccant includes a plurality of block bodies and may easily control a humidity of a transfer chamber through a desiccant equipment that may be installed in and separated from the EFEM.

Although the embodiments of the present disclosure have been described with reference to the accompanying drawings, it will be understood by an ordinary person in the air, to which the present disclosure pertains that the present disclosure may be carried out in other detailed forms while not changing the technical spirit or the essential features. Therefore, it should be understood that the above-described embodiments are exemplary in all aspects and not restrictive.

What is claimed is:

1. A humidity control system for an equipment front end module (EFEM) using desiccant, the humidity control system comprising:

the EFEM including a transfer chamber being a space, in which a processing target object is transferred into a processing module; and a desiccant equipment installed in the EFEM to be separable, and configured to control a humidity of the transfer chamber, wherein the desiccant equipment includes a plurality of block bodies, wherein the plurality of block bodies are configured to be coupled to or separated from each other, and are configured to be transportable individually, wherein each of the plurality of block bodies accommodates at least one humidity control equipment, and wherein the at least one humidity control equipment includes:

a desiccant rotor including an adsorbent configured to adsorb moisture of air that is to be supplied to the transfer chamber, and being rotated by a driving motor; and a regenerative heater configured to heat the air and cause the heated air to remove the moisture adsorbed to the adsorbent.

2. The humidity control system of claim 1, wherein each of the plurality of block bodies has a specific mark, and wherein the specific mark includes any one of a number mark or a mark representing the kind of the at least one humidity control equipment.

3. The humidity control system of claim 1, wherein the at least one humidity control equipment includes:

a branch unit configured to branch dehumidified air exiting from the desiccant rotor;

a regenerative air supply line supplying a portion of the dehumidified air branched in the branch unit to the desiccant rotor to remove the moisture from the adsorbent; and a temperature sensor installed on the regenerative air supply line and configured to measure a temperature of the portion of the dehumidified air, and wherein the regenerative heater is installed on the regenerative air supply line to heat the portion of the dehumidified air when the temperature measured by the temperature sensor is less than a temperature setting value.

4. The humidity control system of claim 3, further comprising:

a temperature and humidity sensor configured to measure a temperature and a humidity of the transfer chamber; and a control device configured to control a degree, by which the regenerative heater heats the portion of the dehumidified air and control a degree, by which the driving motor rotates the desiccant rotor at the same time, depending on the humidity measured by the temperature and humidity sensor.

5. The humidity control system of claim 1, wherein the at least one humidity control equipment includes:

a transfer chamber air recovery line configured to supply the air in the transfer chamber to the desiccant rotor;

a branch unit configured to branch dehumidified air exiting from the desiccant rotor;

a regenerative air supply line supplying a portion of the dehumidified air branched in the branch unit to the desiccant rotor to remove the moisture from the adsorbent; and a dehumidified air supply line configured to supply the remaining portion of the dehumidified air branched in the branch unit to the transfer chamber, wherein the humidity control system further includes:

an outdoor air fan configured to introduce outdoor air into the transfer chamber;

a pneumatic pressure sensor configured to measure a pneumatic pressure of the transfer chamber; and a control device configured to operate the outdoor air fan to cause the pneumatic pressure to reach a pneumatic pressure reference value when the pneumatic pressure measured by the pneumatic pressure sensor is less than the pneumatic reference pressure due to an operation of the at least one humidity control equipment.

6. The humidity control system of claim 1, wherein the at least one humidity control equipment includes:

a transfer chamber air recovery line configured to supply air in the transfer chamber to the desiccant rotor;

a branch unit configured to branch the dehumidified air exiting from the desiccant rotor;

a regenerative air supply line configured to supply a portion of the dehumidified air branched in the branch unit to the desiccant rotor to remove the moisture from the adsorbent; and a dehumidified air supply line configured to supply the remaining portion of the dehumidified air branched in the branch unit to the transfer chamber, wherein the humidity control system further includes:

a humid air humidity sensor installed on the transfer chamber air recovery line;

a dry air humidity sensor installed on the dehumidified air supply line;

a transfer chamber humidity sensor installed in the transfer chamber; and a control device configured to, when a humidity measured by any one of the humid air humidity sensor, the dry air humidity sensor, and the transfer chamber humidity sensor is greater than a reference humidity value, control the regenerative heater to increase a heat output toward the portion of the dehumidified air, and control the driving motor to increase a rotation power toward the desiccant rotor.

* * * * *